United States Patent
Jiang et al.

(10) Patent No.: US 11,108,463 B1
(45) Date of Patent: Aug. 31, 2021

(54) METHOD AND SYSTEM TO DETERMINE PATH AND PATH DISJOINTNESS IN OPTICAL COMMUNICATION NETWORKS

(71) Applicant: HUAWEI TECHNOLOGIES CO., LTD., Guangdong (CN)

(72) Inventors: Zhiping Jiang, Kanata (CA); Ali Salehiomran, Gatineau (CA); Yasser Chiniforooshan, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/878,214

(22) Filed: May 19, 2020

(51) Int. Cl.
  *H04B 10/00* (2013.01)
  *H04B 10/079* (2013.01)
  *H04B 10/61* (2013.01)
  *H04B 10/532* (2013.01)

(52) U.S. Cl.
  CPC ..... *H04B 10/07951* (2013.01); *H04B 10/532* (2013.01); *H04B 10/6162* (2013.01)

(58) Field of Classification Search
  CPC ............ H04B 10/07951; H04B 10/532; H04B 10/6162
  USPC .......................................................... 398/25
  See application file for complete search history.

(56) References Cited

U.S. PATENT DOCUMENTS

| 2013/0188176 A1* | 7/2013 | Lovely | G01D 5/353 |
| | | | 356/73.1 |
| 2014/0071436 A1* | 3/2014 | Cyr | G01M 11/3163 |
| | | | 356/73.1 |
| 2017/0019171 A1* | 1/2017 | Doucet | H04B 10/0771 |
| 2017/0187458 A1 | 6/2017 | Winzer et al. | |

FOREIGN PATENT DOCUMENTS

| CN | 109075867 A | 12/2018 |
| WO | 2011050524 A1 | 5/2011 |

OTHER PUBLICATIONS

Boitier, F. et al., Proactive Fiber Damage Detection in Real-time Coherent Receiver, IEEE, 2017.
Huang, M-F. et al., First Field Trial of Distributed Fiber Optical Sensing and High-Speed Communication Over an Operational Telecom Network, Journal of Lightwave Technology, vol. 38, No. 1, pp. 75-81, Jan. 1, 2020.
International Search Report and Written Opinion issued in corresponding application No. PCT/CN2021/086742 dated Jul. 2, 2021.

* cited by examiner

*Primary Examiner* — Mohammad R Sedighian
(74) *Attorney, Agent, or Firm* — BCF LLP (57) ABSTRACT

The disclosed systems, structures, and methods are directed to an optical communication system. The optical communication system comprising an optical node configured to receive a light signal, in which the light signal is received from a first optical path and a second optical path, and the optical node is further configured to determine a change in state of polarization (SOP) of the light signal received from the first optical path and the second optical path, a processing unit configured to determine if at least a portion of the first optical path and the second optical path has a/similar change in SOP.

23 Claims, 9 Drawing Sheets

METHOD AND SYSTEM TO DETERMINE PATH AND PATH DISJOINTNESS IN OPTICAL COMMUNICATION NETWORKS

CROSS-REFERENCE TO RELATED APPLICATIONS

This is the first application filed for the instantly disclosed technology.

FIELD OF THE INVENTION

The present disclosure generally relates to the field of optical communication networks and, in particular, to methods and systems to determine path disjointness in optical networks.

BACKGROUND

Typical implementation of optical networks, such as, for example, dense wavelength division multiplex (DWDM) networks, involve providing a working path and a protection path in order to provide seamless communication. So in case of an optical fiber link failure in the working path, traffic is routed through the protection path. Such path protection generally requires that the optical fiber links of the working path and the protection path are disjointed to reduce the probability of the protection path and the working path being simultaneously interrupted due to the same optical fiber link failure.

However, the requirement of optical fiber links of the working path being independent and disjoint to the protection path is at times breached by the optical layer. Such breaches include at least a portion of working path and a portion of protection path sharing the same optical fiber, or different optical fibers within same optical cable, or different optical fiber cables that are spatially close to each other.

To this end, there is an interest in identifying the degree of independence and disjointness of the optical fiber links of the working path and the protection path. Further to the identified degree of disjointness, there is also an interest in providing certain remedial measures to overcome this problem.

SUMMARY

An object of the present disclosure is to provide an optical communication system comprising an optical node configured to receive a light signal, in which the light signal is received from a first optical path and a second optical path, and the optical node is further configured to determine a change in state of polarization (SOP) of the light signal received from the first optical path and the second optical path, a processing unit configured to determine if at least a portion of the first optical path and the second optical path has a similar change in SOP.

In accordance with other aspects of the present disclosure, the optical communication system, further comprising at least one acoustic wave generator configured to generate at least one low frequency acoustic wave signal, wherein the at least one low frequency acoustic wave signal is transmitted along the first optical path and the second optical path.

In accordance with other aspects of the present disclosure, the optical communication system, wherein the at least one low frequency acoustic wave signal changes the SOP of the light signal in the first optical path and the second optical path.

In accordance with other aspects of the present disclosure, the optical communication system, wherein the at least one acoustic wave generator comprises a plurality of acoustic wave generators configured to generate a plurality of low frequency acoustic wave signals, in which the plurality of low frequency acoustic wave signals are transmitted along the first optical path and the second optical path.

In accordance with other aspects of the present disclosure, the optical communication system, wherein the plurality of low frequency acoustic wave signals have different frequency components or a combination of frequency components resulting in a different frequency spectrum.

In accordance with other aspects of the present disclosure, the optical communication system, wherein the plurality of low frequency acoustic wave signals have a same frequency spectrum and are transmitted at different time instants along the first optical path and the second optical path.

In accordance with other aspects of the present disclosure, the optical communication system, wherein the plurality of plurality of acoustic wave generators provides frequency and timing information associated with the plurality of low frequency acoustic wave signals to the processing unit.

In accordance with other aspects of the present disclosure, the optical communication system, the optical node extracts low frequency components associated with the at least one low frequency acoustic wave signal in the light signal and the processing unit compares the extracted low frequency components with the frequency components associated with the at least one low frequency acoustic signal and/or the optical node determines the timing information associated with the at least one low frequency acoustic wave signal in the light signal and the processing unit compares the determined timing information with the timing information at which the at least one low frequency acoustic signal was generated.

In accordance with other aspects of the present disclosure, the optical communication system, wherein the optical node comprises a polarizer configured to filter the change in SOP in the light signal, a photodetector configured to convert the light signal provided by the polarizer to electrical signal and a signal processor configured to extract frequency components from the electrical signal.

In accordance with other aspects of the present disclosure, the optical communication system, wherein the optical node further comprises a polarization controller configured to orient the change in SOP in the light signal in a manner that the change in SOP is almost linear and perpendicular when the light signal forwarded to the polarizer.

In accordance with other aspects of the present disclosure, the optical communication system, wherein the optical node is an end node and the end node comprises a first coherent receiver and a second coherent receiver, the optical communication system further comprising a start node comprising a first data transmitter and a second data transmitter, the first data transmitter is configured to transmit a first data-bearing light signal on the working path and the first coherent receiver is configured to receive the first data-bearing light signal, the second data transmitter is configured to transmit a second data-bearing light signal on the protection path and the second coherent receiver is configured to receive the second data-bearing light signal, the first and second coherent receivers are configured to detect the change in SOP in the first and second data-bearing light signal.

In accordance with other aspects of the present disclosure, the optical communication system, wherein the optical node comprises a polarimeter configured to detect the change in SOP in the light signal.

In accordance with other aspects of the present disclosure, the optical communication system, wherein if the change in SOP is induced by natural vibrations, the processing unit is further configured to perform a correlation operation on determined change in SOP of the light signal received from the first optical path and the second optical path and determine a similarity parameter, and if the similarity parameter is above a certain threshold, at least a portion of the first optical path and the second optical path share a common path.

In accordance with other aspects of the present disclosure, the optical communication system, wherein if at least the potion of the first optical path and the second optical path has the similar change in SOP, the processing unit is further configured to change at least a portion of the first optical path or a portion of the second optical path with a different sub-path.

In accordance with other aspects of the present disclosure, the optical communication system, wherein the optical node is an end node and the light signal is transmitted by a start node.

Another object of the present disclosure is to provide an optical communication method comprising receiving, by an optical node, a light signal, in which the light signal is received from a first optical path and a second optical path, determining, by the optical node, a change in state of polarization (SOP) of the light signal received from the first optical path and the second optical path, and determining, by a processing unit, if at least a portion of the first optical path and the second optical path has a similar change in SOP.

In accordance with other aspects of the present disclosure, the optical communication method, further comprising generating, by at least one acoustic wave generator, at least one low frequency acoustic wave signal, wherein the at least one low frequency acoustic wave signal is transmitted along the first optical path and the second optical path.

In accordance with other aspects of the present disclosure, the optical communication method wherein the at least one low frequency acoustic wave signal changes the SOP of the light signal in the first optical path and the second optical path.

In accordance with other aspects of the present disclosure, the optical communication method wherein if at least the potion of the first optical path and the second optical path has the similar change in SOP, changing, by the processing unit, at least a portion of the first optical path or a portion of the second optical path with a different sub-path.

In accordance with other aspects of the present disclosure, the optical communication method wherein the optical node is an end node and the light signal is transmitted by a start node.

BRIEF DESCRIPTION OF THE FIGURES

The features and advantages of the present disclosure will become apparent from the following detailed description, taken in combination with the appended drawings, in which.

It is to be understood that throughout the appended drawings and corresponding descriptions, like features are identified by like reference characters. Furthermore, it is also to be understood that the drawings and ensuing descriptions are intended for illustrative purposes only and that such disclosures are not intended to limit the scope of the claims.

DETAILED DESCRIPTION

Various representative embodiments of the described technology will be described more fully hereinafter with reference to the accompanying drawings, in which representative embodiments are shown. The present technology concept may, however, be embodied in many different forms and should not be construed as limited to the representative embodiments set forth herein. Rather, these representative embodiments are provided so that the disclosure will be thorough and complete, and will fully convey the scope of the present technology to those skilled in the art. In the drawings, the sizes and relative sizes of layers and regions may be exaggerated for clarity. Like numerals refer to like elements throughout.

It will be understood that, although the terms first, second, third, etc. may be used herein to describe various elements, these elements should not be limited by these terms. These terms are used to distinguish one element from another. Thus, a first element discussed below could be termed a second element without departing from the teachings of the present technology. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is only intended to describe particular representative embodiments and is not intended to be limiting of the present technology. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules or units which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

With these fundamentals in place, we will now consider some non-limiting examples to illustrate various implementations of aspects of the present disclosure.

Figure 1:
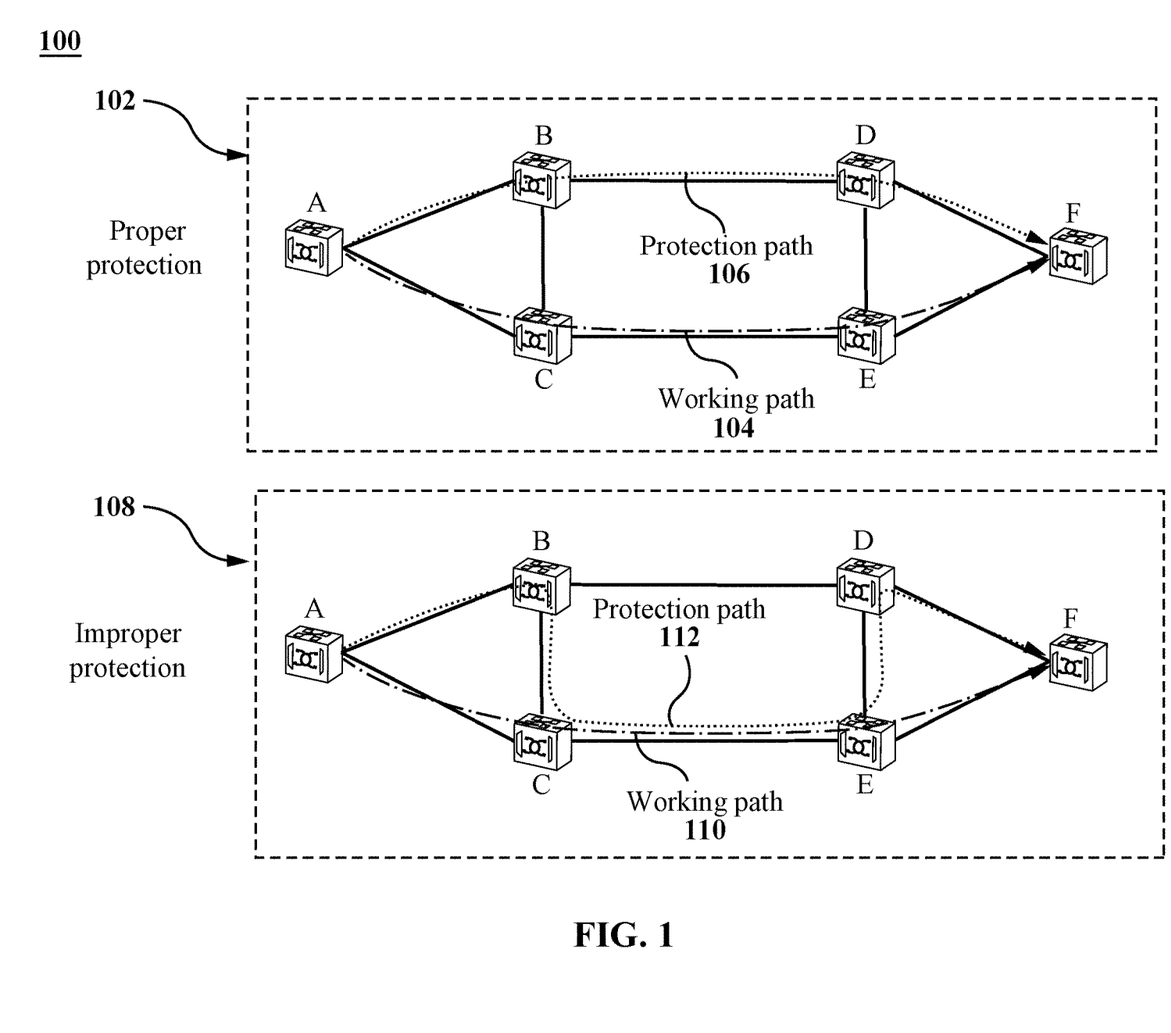
FIG. 1 (Prior Art) depicts a block diagram of an optical network.

Referring now to the drawings, FIG. 1 depicts a block diagram of an optical network 100. As shown, the optical network 100 typically includes a plurality of optical nodes that may include optical multiplexing sections (OMSs) comprising optical add-drop multiplexers, such as, for example, a reconfigurable optical add-drop multiplexers (ROADMs) A, B, C, D, E, and F each containing at least one wavelength selective switch (WSS). Each node may be configured to add, remove, and/or reroute a wavelength.

Each OMS based node may further comprise multiple optical transport sections (OTSs), where at each OTS wavelength remains same.

Each node in the optical network 100 may also incorporate one or more laser light sources configured to produce, emit, or radiate pulses of light with certain pulse duration. In certain embodiments, one or more pulsed laser light sources may comprise one or more laser diodes, such as but not limited to: Fabry-Perot laser diode, a quantum well laser, a distributed Bragg reflector (DBR) laser, a distributed feedback (DFB) laser, or a vertical-cavity surface-emitting laser (VCSEL). Just as examples, a given laser diode may be an aluminum-gallium-arsenide (AlGaAs) laser diode, an indium-gallium-arsenide (InGaAs) laser diode, or an indium-gallium-arsenide-phosphide (InGaAsP) laser diode, or any other suitable laser diode.

It is also contemplated that the emitted light may be single polarized, dual polarized, or randomly polarized, may have a particular polarization (e.g. linearly polarized, elliptically polarized, or circularly polarized).

Further, each node in the optical network 100 may incorporate multiple optical amplifiers, e.g., erbium-doped fiber amplifiers (EDFAs), for amplifying the optical signals. The optical network 100 may further employ one or more optical network elements and modules (which may include either or both of active and passive elements/modules), such as, for example, optical filters, WSSs, arrayed waveguide gratings, optical transmitters, optical receivers, processors and other suitable components. However, for purposes of simplicity and tractability, these elements have been omitted from FIG. 1.

It is to be contemplated that nodes in the optical network may be communicatively connected by virtue of links including optical cables, where each optical cable may include a plurality of optical fibers. The optical fiber may be of any suitable type such as, for example, single mode optical fiber, multi-mode optical fiber, standard single mode fibers (SSMFs), large effective area fibers (LEAFs) or the like. The links also include a plurality of optical amplifiers, such as, for example, EDFAs. The link between two nodes further includes optical amplifiers.

By way of example, an implementation of the optical network 100 may include a working path and a protection path. For example, in the optical network 100, a start node may be node A and the destination node may be node F. As depicted by 102 in FIG. 1, the working path 104 and protection path 106 may be disjoint in terms of optical fibers or optical cables. For example, in implementation 102 the working path 104 may be implemented using path A→C→E→F and the protection path 106 may be implemented using path A→B→D→F. As shown, in implementation 102, the working path 104 and the protection path 106 are completely disjointed. To this end, even any one the optical cable or an optical fiber in the optical cable malfunctions due to any reason along the working path, traffic between node A and F may be redirected to the protection path.

In other implementations, such as depicted by implementation 108 of FIG. 1, at least a portion of working path 110 and a portion of protection path 112 share the same optical fiber, or different optical fibers but within same optical cable, or different optical fiber cables that are too close to each other. For example, in implementation 108 the working path 110 may be implemented using path A→C→E→F and the protection path 112 may be implemented using path A→B→C→E→D→F. As shown, in implementation 108 both the working path 110 and the protection path 112 have a common path segment C→E. To this end, in the event of any of the optical fiber in the optical cable malfunctions due to any reason, the traffic between node A and F may be redirected from the working path 110 to the protection path 112. However, if the malfunction occurs along path C→E, the communication between the node A and node B is completely interrupted for both the working path 110 and the protection path 112.

Hence, a key point of interest while implementing the working path and the protection path on the optical network 100 is to achieve optical link independences and disjointness between the two paths.

Figure 2:
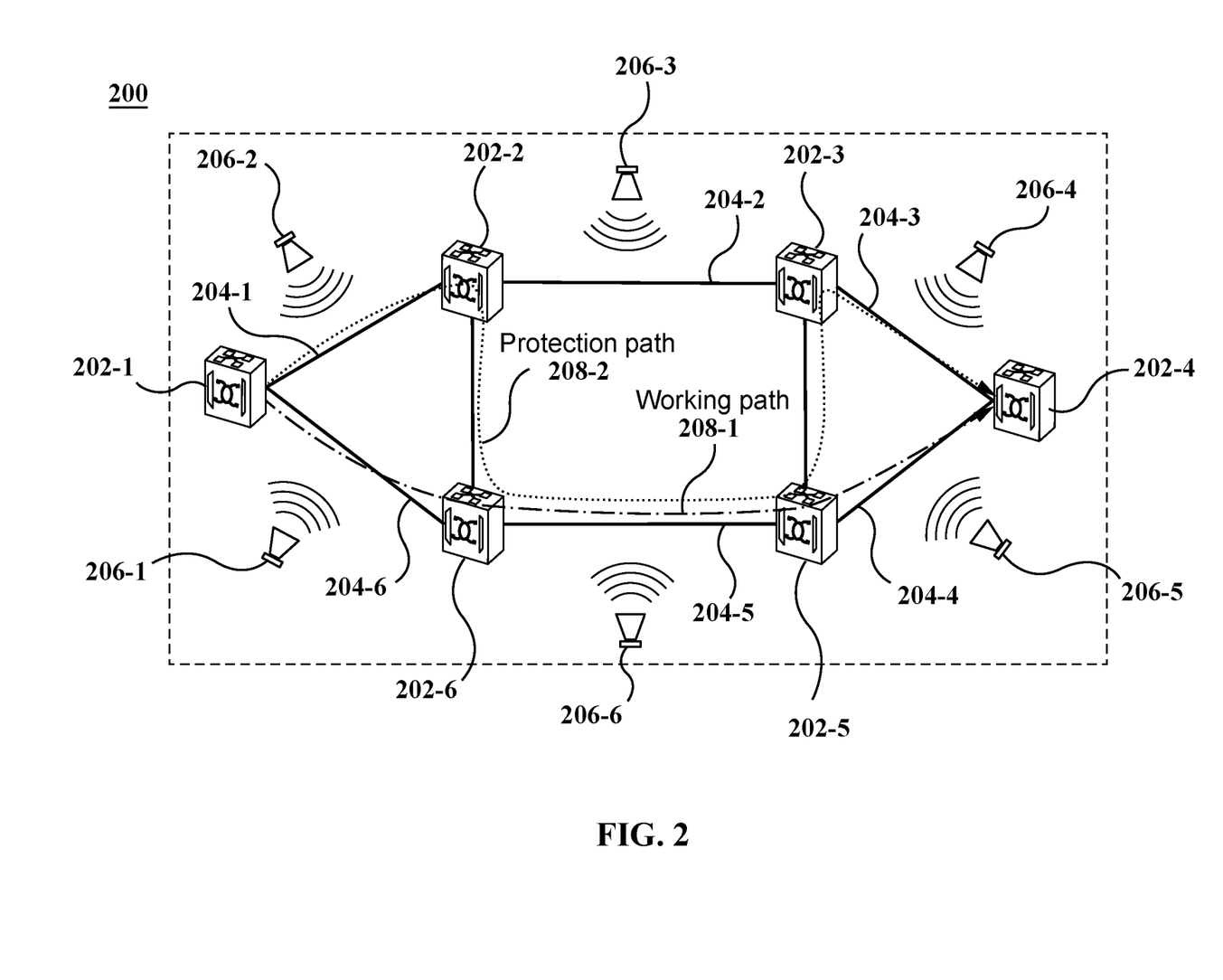
FIG. 2 depicts a high-level functional block diagram of an optical network, in accordance with various embodiments of the present disclosure.

To this end, FIG. 2 depicts a high-level functional block diagram of an optical network 200, in accordance with various embodiments of the present disclosure. As shown, optical network 200 comprises a plurality of optical nodes 202-1, 202-2 . . . 202-6, and a plurality of acoustic wave generators 206-1, 206-2 . . . 206-6. The links between each node in the plurality of optical nodes 202-1, 202-2 . . . 202-6 may be connected by a plurality of optical cables 204-1, 204-2 . . . 204-6 respectively as shown. It is to be noted that other components may be present but are not shown for the purpose of simplicity and tractability. Further, it is to be contemplated that the plurality of optical nodes 202-1, 202-2 . . . 202-6 and the plurality of optical cables 204-1, 204-2 . . . 204-6 may be implemented as discussed above for the nodes and optical cables associated with the optical network 100.

As noted above, while implementing working paths, such as, for example, working path 208-1 and protection path, such as, for example, protection path 208-2 in the optical network 200, optical links between the working path 208-1 and the protection path 208-2 should be independent and disjoint. However, at times at least a portion of working path and a portion of protection path either share the same optical fiber, share different optical fibers within same optical cable, or share different optical fiber cables that are close to each other. In order to determine the degree of disjointness between the working and protection paths, optical network 200 includes the plurality of acoustic wave generators 206-1, 206-2 . . . 206-6.

In certain embodiments, one acoustic wave generator is placed between two nodes. For example, the acoustic wave generator 206-1 may be placed between the nodes 202-1 and 202-6, the acoustic wave generator 206-2 may be placed between the nodes 202-1 and 202-2 and so on. The plurality of acoustic wave generators 206-1, 206-2 . . . 206-6 may be configured to generate low frequency acoustic signals. In certain embodiments, the range of low frequency may lies in between 0 to 1000 Hz.

Figure 3:
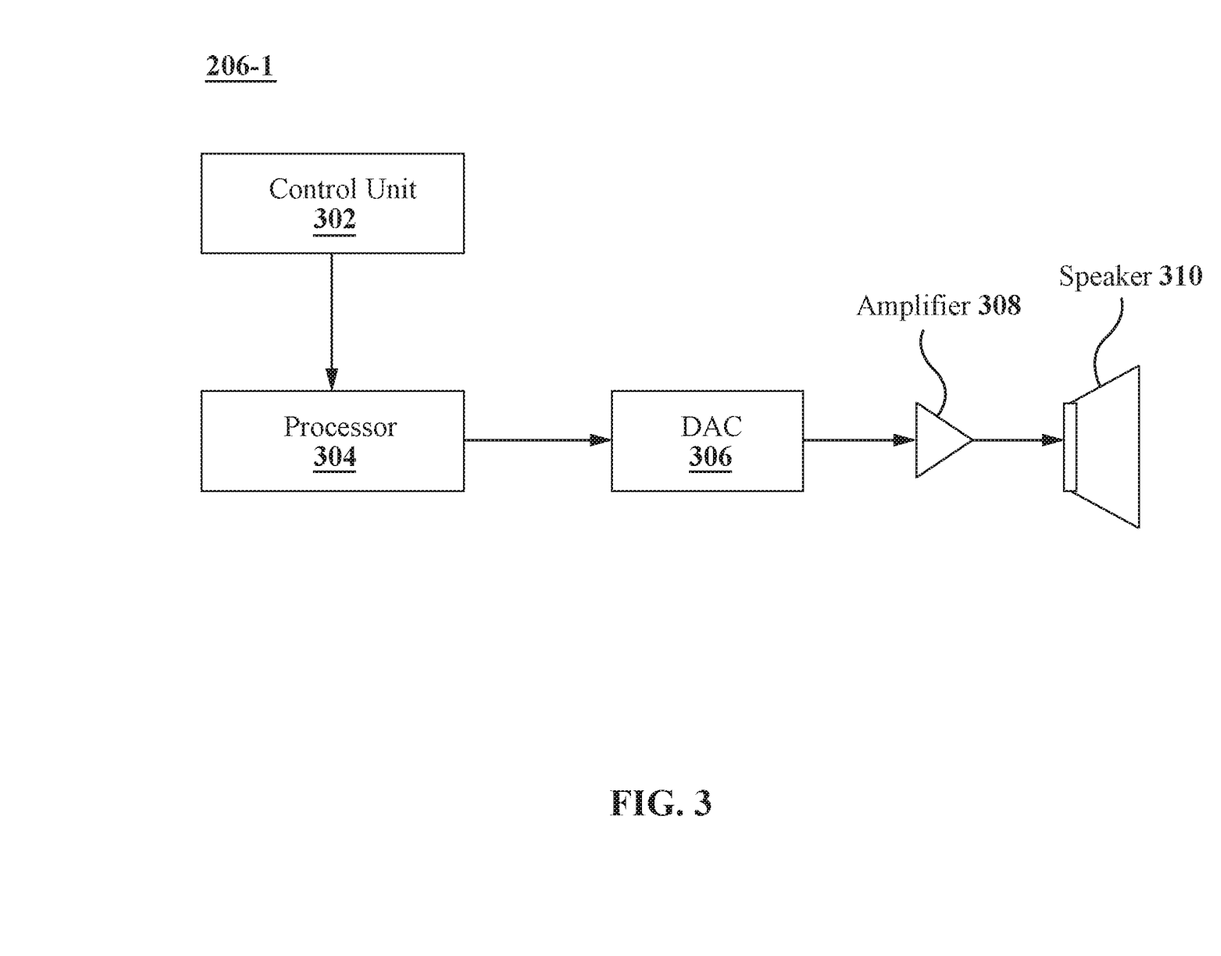
FIG. 3 illustrates a non-limiting example of the acoustic wave generator, in accordance with various embodiments of present disclosure.

FIG. 3 illustrates a non-limiting example of acoustic wave generator 206-1 in accordance with various embodiments of present disclosure. It will be appreciated that the remaining acoustic wave generators 206-2, 206-3 . . . 206-6 may be implemented in a similar manner as the acoustic wave generator 206-1. As shown, acoustic wave generator 206-1 includes a control unit 302, a processor 304, a digital to analog convertor (DAC) 306, an amplifier 308 and a speaker 310. It is to be noted that other components may be present but have not shown for the purpose of simplicity and tractability.

In certain embodiments, control unit 302 may be configured to perform various functionalities, such as, for example, synchronization among other acoustic wave generators 206-2, 206-3 . . . 206-6, instructs processor 304 to generate low frequency signals, providing certain associated information such as frequency information or timing information to other components, or the like. The processor 304 may be configured to generate low frequency signals in accordance with the instructions received from the control unit. The generated low frequency signals may be single tone, dual tone or multi-tone acoustic digital signals within the frequency range of 0 to 1000 Hz.

The low frequency digital signals are provided to the DAC 306 in order to convert the digital signals to analog signals. It is to be contemplated that in certain embodiments the power associated with the analog signals may not be sufficient to drive the speaker 310. As such, the analog signals may be fed to amplifier 308 to increase the power of the analog signals to sufficient level so that they can adequately drive speaker 310.

Returning to FIG. 2, by way of an example, working path 208-1 and protection path 208-2 may begin at optical node 202-1 and terminate at optical node 202-4. The path being followed by working path 208-1 may include optical nodes 202-1→202-6→202-5→202-4. The path being followed by protection path 208-2 may include optical nodes 202-1→202-2→202-6→202-5→202-3→202-4.

In certain embodiments, the light signal for detection between two nodes may include propagation of polarized continuous wave (CW) light signal through optical fibers. However, the scope of present disclosure is equally applicable to the ongoing optical signals, such as dual-polarization coherent signals without limiting the scope of present disclosure.

In order to determine the disjointness between working path 208-1 and protection path 208-2, the plurality of acoustic wave generators 206-1, 206-2 . . . 206-6 may be configured to generate low frequency acoustic signals to change the state of polarization (SOP) of the light signal being propagated through the associated optical fibers.

In one example, to determine the disjointness between working path 208-1 and protection path 208-2, at least one light signal having at least one wavelength is transmitted between start node 202-1 and end node 202-4 on both the working path 208-1 and the protection path 208-2. The plurality of acoustic wave generators 206-1, 206-2 . . . 206-6 may be placed near to the plurality of optical cables 204-1, 204-2 . . . 204-6. In so doing, the low frequency acoustic signals may change the SOP of the at least one light signal propagating between the start node 202-1 and the end node 202-4. Such change in SOP may be detected by end node 202-4. In case, a portion of working path 208-1 and protection path 208-2 has a similar change in SOP in the light signal in, at least one link is not disjoint in working path 208-1 and protection path 208-2.

In certain embodiments, the plurality of acoustic wave generators 206-1, 206-2 . . . 206-6 may incorporate a synchronization mechanism. Such that, if the plurality of acoustic wave generators 206-1, 206-2 . . . 206-6 are generating the same low frequency acoustic signal, then at one time only one acoustic wave generator is configured to transmit the low frequency acoustic signal to avoid changing polarization in the entire network simultaneously.

In a non-limiting embodiment, the plurality of acoustic wave generators 206-1, 206-2 . . . 206-6 may be configured to generate same low frequency acoustic signal, such as, for example, acoustic signal with frequency 100 Hz. To this end, the plurality of acoustic wave generators 206-1, 206-2 . . . 206-6 may be configured to transmit the acoustic signal with frequency 100 Hz at different time instants $t_1, t_2, \ldots t_6$ respectively. In certain embodiments, the plurality of acoustic wave generators 206-1, 206-2 . . . 206-6 may provide such timing information to end node 202-4 for detection of a respective change in SOP in light signal in the working path 208-1 and the protection path 208-2.

In another non-limiting embodiment, the plurality of acoustic wave generators 206-1, 206-2 . . . 206-6 may be configured to generate different low frequency acoustic signal, such as, for example, acoustic wave generator 206-1 may generate a single-tone acoustic signal with a frequency 100 Hz, acoustic wave generator 206-2 may generate a single-tone acoustic signal with a frequency 150 Hz, and so on. In another example, the plurality of acoustic wave generators 206-1, 206-2 . . . 206-6 may generate different dual-tone or multi-tone low frequency signals.

In other embodiments, the plurality of acoustic wave generators 206-1, 206-2 . . . 206-6 may be configured to simultaneously transmit the respective acoustic signals. In yet other embodiments, the plurality of acoustic wave generators 206-1, 206-2 . . . 206-6 may be configured to transmit the respective acoustic signals at time instant $t_1, t_2, \ldots t_6$ respectively. The plurality of acoustic wave generators 206-1, 206-2 . . . 206-6 may provide such timing information and frequencies associated with the acoustic signals to end node 202-4 for detection of a respective change in SOP in light signal in the working path 208-1 and the protection path 208-2.

In a further example, instead of incorporating the plurality of acoustic wave generators 206-1, 206-2 . . . 206-6, the optical network 200 may have a one or more mobile acoustic wave generators configured to move around the entire working path 208-1 and the entire protection path 208-2 to change the SOP of the light signal. In some embodiments, such mobile acoustic wave generators other components as well, such as, for example, global positioning system (GPS), communication transmitter/receiver or the like. To this end, when the mobile acoustic wave generators transmits low frequency acoustic wave signals along the optical fibers, they may also communicate with the end node such as end node 202-4 and may provide their acoustic wave frequencies, signal pattern, timing information, GPS coordinates etc. to the end node 202-4. Based on such information, the end node 202-4 may be configured to determine change in SOP in the light signal. It is contemplated that how the acoustic signals are generated and transmitted should not limit the scope of the present disclosure.

Returning to FIG. 2, as previously discussed, at least one light signal transmitted between start node 202-1 and end node 202-4 on both working path 208-1 and protection path 208-2. In order to determine the disjointness, at least one acoustic wave generator in the plurality of acoustic wave generators 206-1, 206-2 . . . 206-6 is configured to transmit low frequency acoustic wave signal towards at least one of the plurality of optical cables 204-1, 204-2 . . . 204-6, such that the low frequency acoustic signal changes the SOP of the light signal propagating through at least one of the plurality of optical cables 204-1, 204-2 . . . 204-6.

Figure 4:
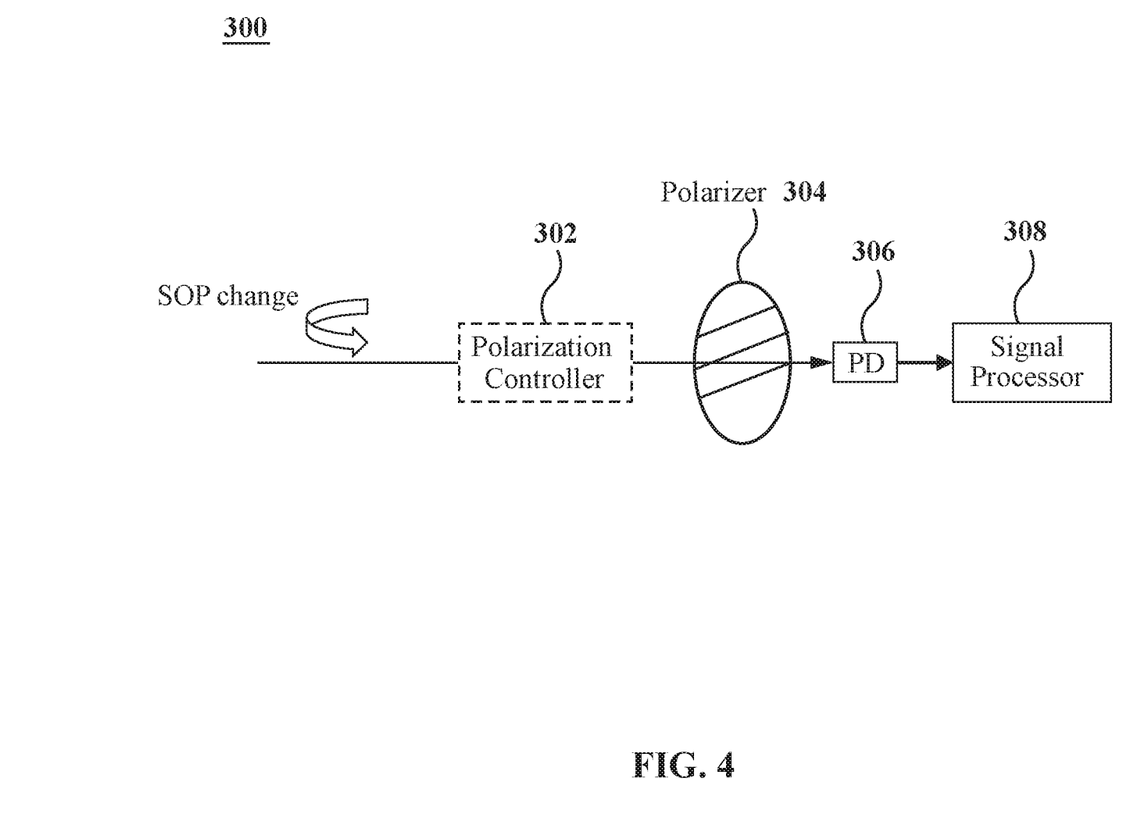
FIG. 4 illustrates SOP change detector included in each node in a plurality of nodes among other components, in accordance with various aspects of the present disclosure.

Such changes in the SOP are then detected by end node 202-4. In certain embodiments, each node in the plurality of nodes 202-1, 202-2 . . . 202-6 further comprises various components to detect this change in SOP. To this end, FIG. 4 illustrates SOP change detector 300 included in each node in the plurality of nodes 202-1, 202-2 . . . 202-6 among other components, in accordance with various aspects of the present disclosure. As shown, the SOP change detector 300 comprises a polarization controller 302, a polarizer 304, a photodetector 306, and a signal processor 308. It is to be noted that other components may be present but have not shown for the purpose of simplicity and tractability.

In certain embodiments, the received light signal by the end node 202-4 may be forwarded to the polarization controller 302. The polarization controller 302 may be configured to orient the change in SOP in the light signal in such a manner, so that the change in SOP is almost linear and perpendicular when the light signal forwarded to the polarizer 304. In so doing, polarization controller 302 may increase the sensitivity of polarizer 304 to the change in SOP. The polarizer 304 may be configured to convert the change in SOP of the light signal into a corresponding light intensity. The corresponding light intensity is then supplied to the photodetector 306.

The photodetector 306 may be configured to convert the corresponding light intensity to an electrical signal and forward the electrical signal to signal processor 308. The signal processor 308 may be configured to perform a spectrum analysis in order to extract the frequency components associated with the low frequency acoustic wave signal transmitted by at least one acoustic wave generator in the plurality of acoustic wave generators 206-1, 206-2 . . . 206-6.

If a similar low acoustic wave signal is detected in the working path 208-1 as well as in the protection path 208-2, then at least one location between two nodes 202-1 and 202-4 has at least a portion of working path 208-1 and protection path 208-2 evidences a similar change in SOP. That is, working path 208-1 and protection path 208-2 are neither independent and nor disjoint.

It will be appreciated that how the end node 202-4 identifies the change in SOP in the light signal should not limit the scope of present disclosure. As previously discussed, the scope of present disclosure is equally applicable to the ongoing optical signals, such as dual-polarization coherent signals, polarization multiplexed-quadrature multiplexed (PM-QAM) signals. In case of such signal transmissions, each node in the plurality of nodes 202-1, 202-2, . . . 202-6 may employ coherent receivers. Typically coherent receivers include Digital signal processors, which are configured to determine and track change in SOP of the light signals by their equalizers. In some embodiments, coherent receivers may determine track change in SOP of the light signals from the equalizer's rotation matrix.

Figure 5:
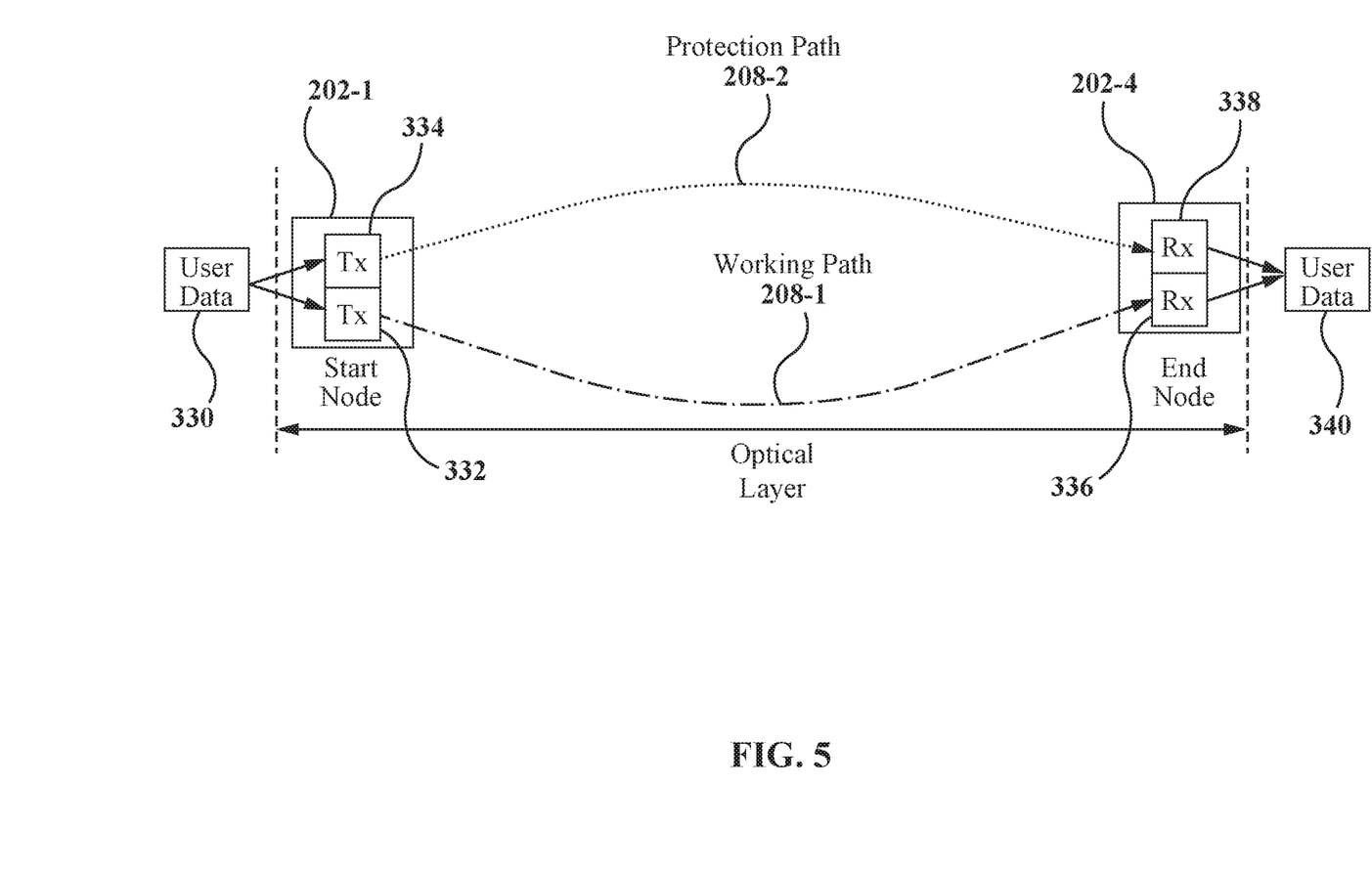
FIG. 5 illustrates a high-level functional block diagram communication in the optical network based on coherent detection, in accordance with various embodiments of present disclosure.

With that said, FIG. 5 illustrates a high-level functional block diagram communication in the optical network 200 based on coherent detection, in accordance with various embodiments of present disclosure. As shown, the start node 202-1 comprises a first data transmitter 332 and a second data transmitter 334. The end node 202-4 further comprises a first coherent receiver 336 and a second transmitter 338. It is to be noted that for the purpose of simplicity, data transmitters 332 and 334 have been illustrated with start node 202-1 and coherent receivers 336 and 338 have been illustrated with end node 202-2. However, each node in the plurality of nodes 202-1, 202-2 . . . 202-6 may have data transmitters 332 and 334 and coherent receivers 336 and 338.

At start node 202-1, first data transmitter 332 transmits a first data-bearing light signal associated with a user data 330 on the working path 208-1 and the data-bearing light signal is received by first coherent receiver 336. Second data transmitter 334 transmits a data-bearing light signal associated with a user data 330 on protection path 208-2 and the data-bearing light signal is received by second coherent receiver 338. It is contemplated that the data-bearing light signal propagating on working path 208-1 and protection path 208-2 may be subject to change in SOP either by the low frequency acoustic signal generated by at least one of the plurality of acoustic wave generator 206-1, 206-2, . . . 206-6 or by natural vibrations. First coherent receiver 336 and second coherent receiver 338 may be configured to determine change in SOP in the corresponding signal along with extracting user data 240.

If first coherent receiver 336 and second coherent receiver 338 detects a similar change in SOP in the working path 208-1 as well as in the protection path 208-2, then at least one location between two nodes 202-1 and 202-4 has at least a portion of working path 208-1 and protection path 208-2 evidences a similar change in SOP. That is, working path 208-1 and protection path 208-2 are neither independent and nor disjoint In yet other embodiments, the end node 202-4 may comprise a polarimeter to determine the change in SOP in the light signal and extract the frequency components associated with the low frequency acoustic wave signal. Also, in certain embodiments, the end node 202-4 may be configured to determine the timing information associated with the low frequency acoustic wave signal. Such timing information may include the time instant at which the low frequency acoustic wave signal was initially transmitted.

Figure 6:
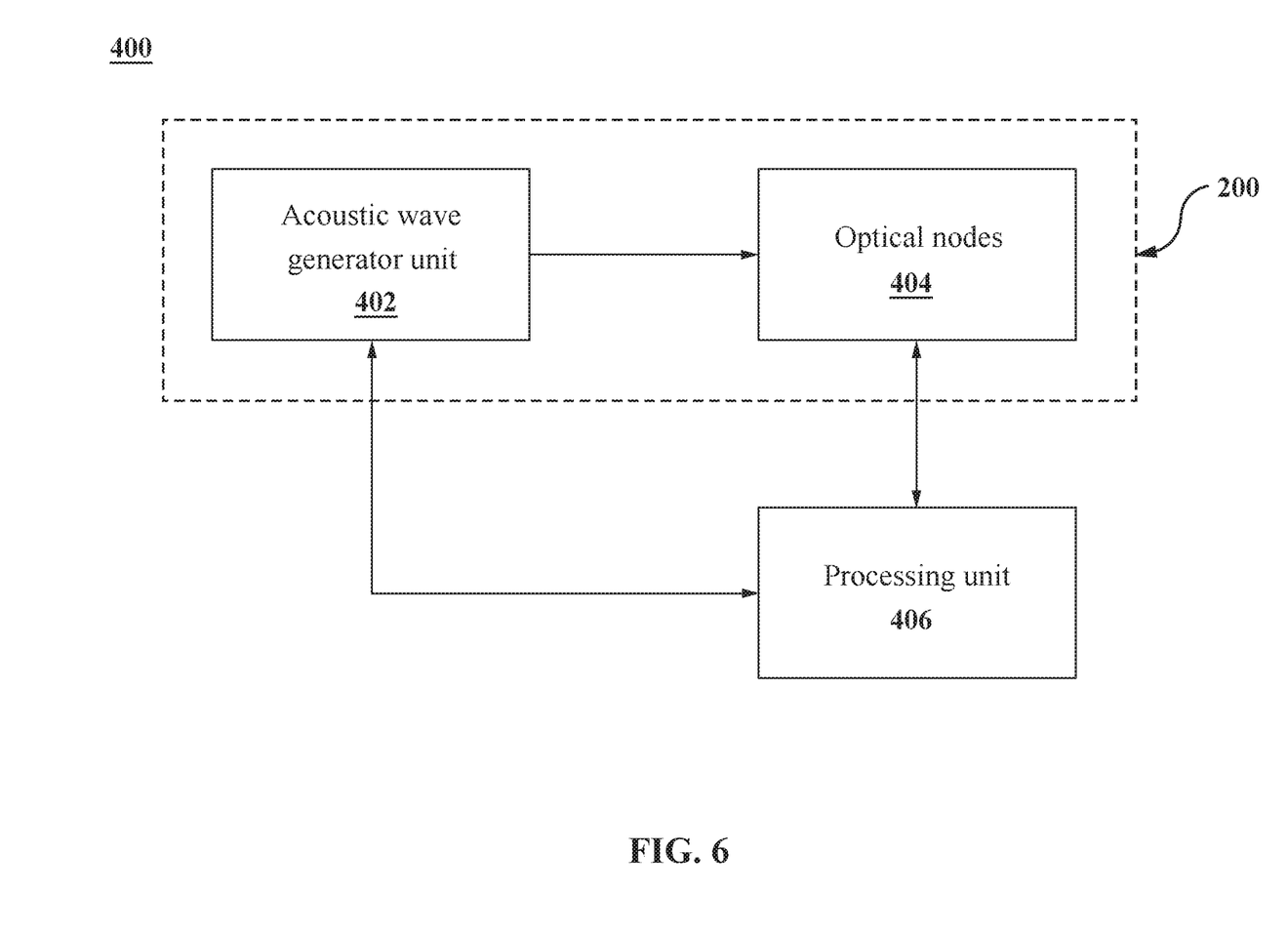
FIG. 6 illustrates a high level functional block diagram of a system configured to determine the non-disjoint links in the optical network, in accordance with various embodiments of present disclosure.

FIG. 6 illustrates a high level functional block diagram of a system 400 configured to determine the non-disjoint links in the optical network 200, in accordance with various embodiments of present disclosure. As shown, system 400 comprises optical network 200 and a processing unit 406. Further, it has been illustrated that optical network 200 comprises an acoustic wave generator unit 402 and optical nodes 404. However, it is to be contemplated that the acoustic wave generator unit 402 may represent the plurality of acoustic wave generators 206-1, 206-2 . . . 206-6 and the optical nodes 404 may represent the plurality of nodes 202-1, 202-2 . . . 202-6 connected by the plurality of optical cables 204-1, 204-2 . . . 204-6.

As previously discussed, end node 202-4 extracts the frequency components associated with the low frequency acoustic wave signal and if this extracted frequency component appears in both the working path 208-1 and the protection path 208-2 has a similar change in SOP. The end node 202-4 may provide the extracted frequency components to the processing unit 406.

In certain embodiments, acoustic wave generator unit 402 may be configured to provide certain information associated with the plurality of acoustic wave generators 206-1, 206-2 . . . 206-6 to processing unit 406. In one embodiment, such information may include the frequency information associated each of the plurality of acoustic wave generators 206-1, 206-2 . . . 206-6. For example, if the acoustic wave generator generates and transmits a low frequency signal of 100 Hz, then the acoustic wave generator unit 402 may provide this frequency information to processing unit 406. In another embodiment, such information may include the timing information associated each of the plurality of acoustic wave generators 206-1, 206-2 . . . 206-6. For example, if the acoustic wave generator generates and transmits a low frequency signal of $t_1$, then acoustic wave generator unit 402 may provide this information to processing unit 406.

The processing unit 406 may be configured to determine if at least a portion of working path 208-1 and protection path 208-2 has a similar change in SOP in light signal. Further, processing unit 406 may be configured to determine which particular acoustic wave generator is responsible for changing SOP of the light signal propagating in portion common in both working path 208-1 as well as protection path 208-2. By way of example, in FIG. 2, the link between nodes 202-5 and 202-6 may share a common portion of working path 208-1 and protection path 208-2. That is, a portion of working path 208-1 and a portion of protection path 208-2 between nodes 202-5 and 202-6 share the same optical fiber, or share different optical fibers but within same optical cable 204-5.

To this end, the low frequency acoustic signal generated and transmitted by the acoustic wave generator 202-6 may result in change in SOP of the light signal propagating both in working path 208-1 as well as protection path 208-2 between nodes 202-5 and 202-6. The processing unit 406 may be configured to identify acoustic wave generator 202-6 and, hence, the optical cable 204-5 which is common to both working path 208-1 and protection path 208-2.

In certain embodiments, processing unit 406 may compare the extracted frequency components associated with low frequency acoustic wave signal by the end node such as end node 202-4 with the respective frequency information associated with the plurality of acoustic wave generators 206-1, 206-2 . . . 206-6. For example, if the extracted frequency components match to those of the low frequency acoustic wave signal as generated and transmitted by acoustic wave generator 202-6, then the identified optical cable common to both working path 208-1 and protection path 208-2 is optical cable 204-5.

In certain embodiments, processing unit 406 may compare the timing information with low frequency acoustic wave signal determined by the end node such as end node 202-4 with the respective timing information associated with the plurality of acoustic wave generators 206-1, 206-2 . . . 206-6. For example, if the determined timing information matches to the time instant at which the low frequency acoustic wave signal was transmitted by acoustic wave generator 202-6, then the identified optical cable common to both working path 208-1 and protection path 208-2 is optical cable 204-5.

In certain embodiments, natural vibration may induce change in SOP in the light signal in working path 208-1 and protection path 208-2. If the change in SOP in the light signal is due to natural vibrations instead of low frequency acoustic signals, processing unit 406 may perform a correlation operation on determined change in SOP of the light signal received from working path 208-1 and protection path 208-2. In so doing, processing unit 406 may determine a similarity parameter. If the similarity parameter is above a certain threshold, then at least a portion of working path 208-1 and protection path 208-2 share a common path. That is, the two paths are neither independent and nor disjoint.

In certain embodiments, processing unit 406 may be configured to change a portion of working path 208-1 and/or a portion of protection path 208-2 to make the two paths independent and disjoint. By way of example in FIG. 2, processing unit 406 may change the implementation of protection path 208-2 from nodes 202-1→202-2→202-6→202-5→202-3→202-4 to nodes 202-1→202-2→202-3→202-4 making working path 208-1 and protection path 208-2 independent and disjoint. In particular, processing unit 406 may change the initial sub-path from 202-2→202-6→202-5→202-3 to 202-2→202-3.

It is to be noted that processing unit 406 may comprise one or more computing devices, represented as a single server 406. Although represented as a single server, processing unit 406 may be implemented as one or more real or virtual servers. Further, it will be appreciated that although processing unit 406 has been shown external to optical network 200 however, in certain embodiments, processing unit 406 may be incorporated with in each optical node in the plurality of optical nodes 202-1, 202-2, . . . 202-6. It is to be contemplated that existing hardware components may be used while implementing processing unit 406 with in each optical node, thereby saving some cost in terms of resources required for such implementation.

Figure 7:
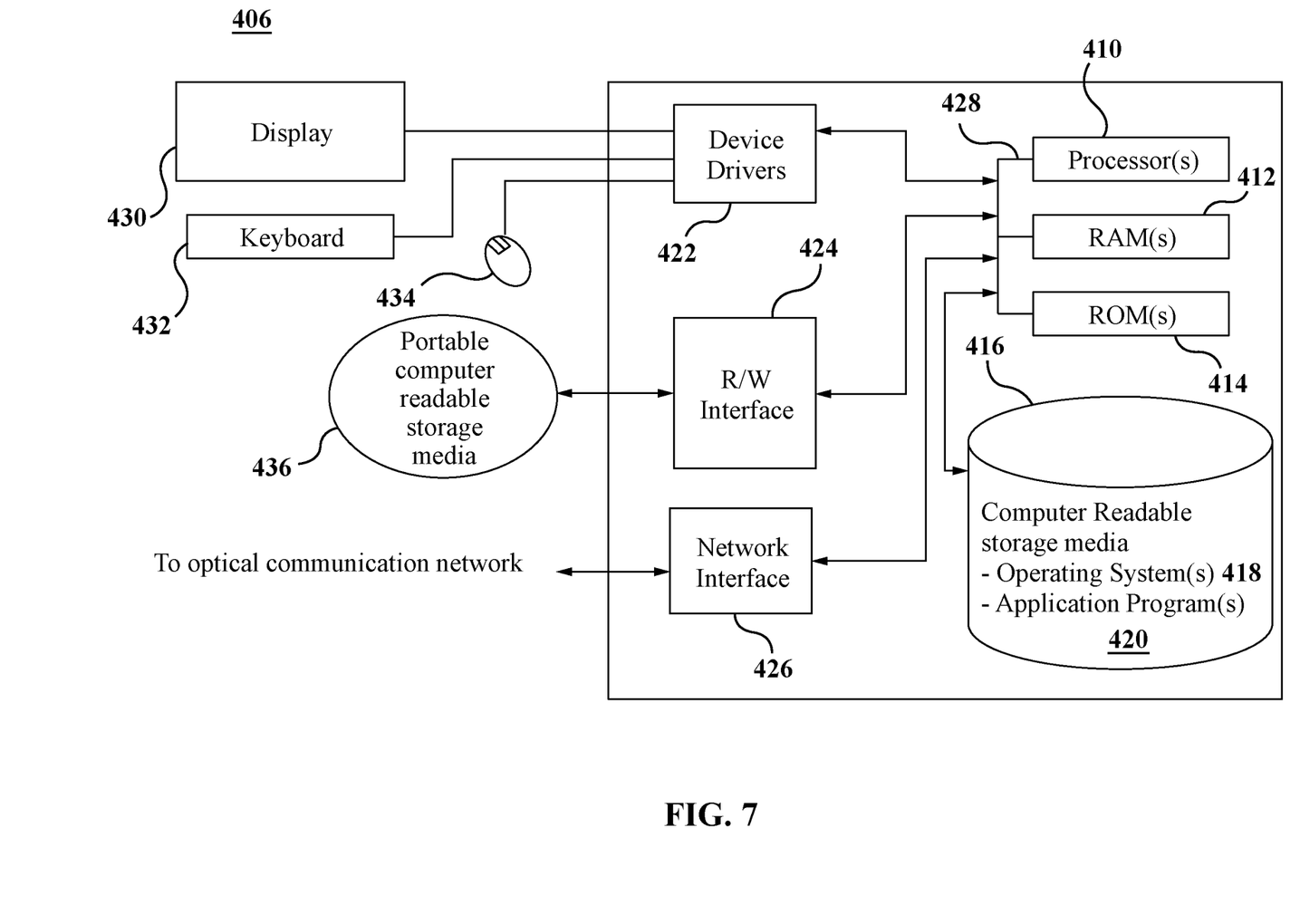
FIG. 7 depicts a high-level block diagram of representative components for the processing unit, in accordance with various embodiments of the present disclosure

FIG. 7 depicts a high-level block diagram of representative components for processing unit 406, in accordance with various embodiments of the present disclosure. It should be appreciated that FIG. 7 provides only an illustration of one implementation of processing unit 406 and does not imply any limitations with regard to the environments in which different embodiments may be implemented. Many modifications to the depicted environment can be done to implement processing unit 406 without departing from the principles presented herein.

As shown, processing unit 406 employs one or more processors 410, one or more computer-readable random access memories (RAMs) 412, one or more computer-readable read only memories (ROMs) 414, one or more computer-readable storage media 416, device drivers 422, a read/write (R/W) interface 424, a network interface 426, all interconnected over a communications fabric 120. Communication fabric 428 may be implemented with any architecture designed for passing data and/or control information between processors (such as microprocessors, communications and network processors, etc.), memory, peripheral devices, and any other hardware components within a system.

One or more operating system(s) 418 and one or more application program(s) 420 are stored on one or more of computer-readable storage media 416 for execution by one or more of the processors 410 via one or more of the respective RAMs 412 (which typically include a cache memory). In the illustrated embodiment, each of computer-readable storage media 416 may be a magnetic disk storage device of an internal hard drive, CD-ROM, DVD, memory stick, magnetic tape, magnetic disk, optical disc, a semiconductor storage device such as RAM, ROM, EPROM, flash memory or any other computer-readable tangible storage device that can store a computer program and digital information.

Processing unit 406 may also include the R/W drive or interface 424 to read from and write to one or more portable computer readable storage media 436. Application programs 420 on said devices may be stored on one or more of the portable computer readable storage media 436, read via the respective R/W drive or interface 424 and loaded into the respective computer readable storage media 416.

It will be appreciated that in certain embodiments the application programs 420 stored on one or more of the portable computer readable storage media 436 may configure processing unit 406 to provide various functionalities, in accordance with various embodiments of the present disclosure.

Application programs 420 on the said processing unit 406 may be downloaded to processing unit 406 from an external computer or external storage device via a communication network (for example, the Internet, a local area network or other wide area network or wireless network) and network interface 426. From network interface 426, the programs may be loaded onto computer-readable storage media 416.

Processing unit 406 may also include a display screen 430, a keyboard or keypad 432, and a computer mouse or touchpad 434. The device drivers 422 may interface to display screen 430 for imaging, to keyboard or keypad 432, to a computer mouse or touchpad 434, and/or to display screen 430 (in case of touch-screen display) for pressure sensing of alphanumeric character entry and user selections.

Device drivers 422, R/W interface 424 and network interface 426 may comprise hardware and software (stored on computer-readable storage media 416 and/or ROM 414).

The programs described herein are identified based upon the application for which they are implemented in a particular embodiment of the present disclosure. However, it should be appreciated that any particular program nomenclature herein is used merely for convenience, and thus the disclosure should not be limited to use solely in any specific application identified and/or implied by such nomenclature.

It will be appreciated that processing unit 406 may be a server, a desktop computer, a laptop computer, a tablet, a smartphone, a personal digital assistant or any device that may be configured to implement the present technology, as should be understood by a person skilled in the art.

Figure 8:
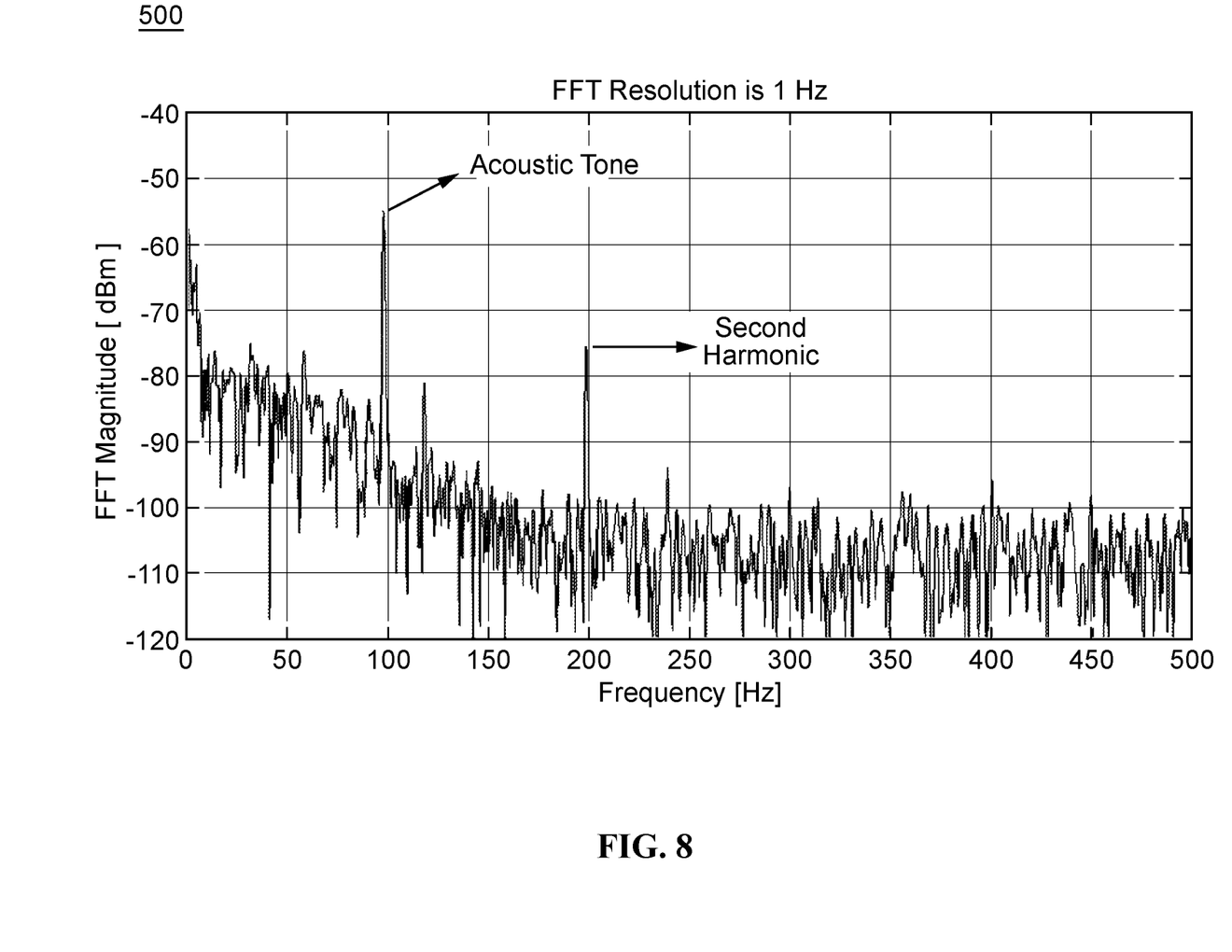
FIG. 8 illustrates an experimental outcome of a frequency spectrum extracted by an end node, in accordance with various embodiments of present disclosure.

FIG. 8 illustrates an experimental outcome 500 of a frequency spectrum extracted by the end node 204-4, in accordance with various embodiments of present disclosure. As shown, experimental outcome 500 represents the frequency spectrum extracted by end node 204-4. It is prominent in the frequency spectrum a low frequency component of 100 Hz representing a change in SOP. Further, in this outcome the change in SOP was in terms of rotation as approximately equals to $10^{-4}$ radian. Other observations in experimental outcome 500 were the acoustic pressure computed was equal to 85 dB and signal-to-noise ratio (SNR) was equal to 40 dB. It was also observed that SNR is better for a low acoustic power.

Figure 9:
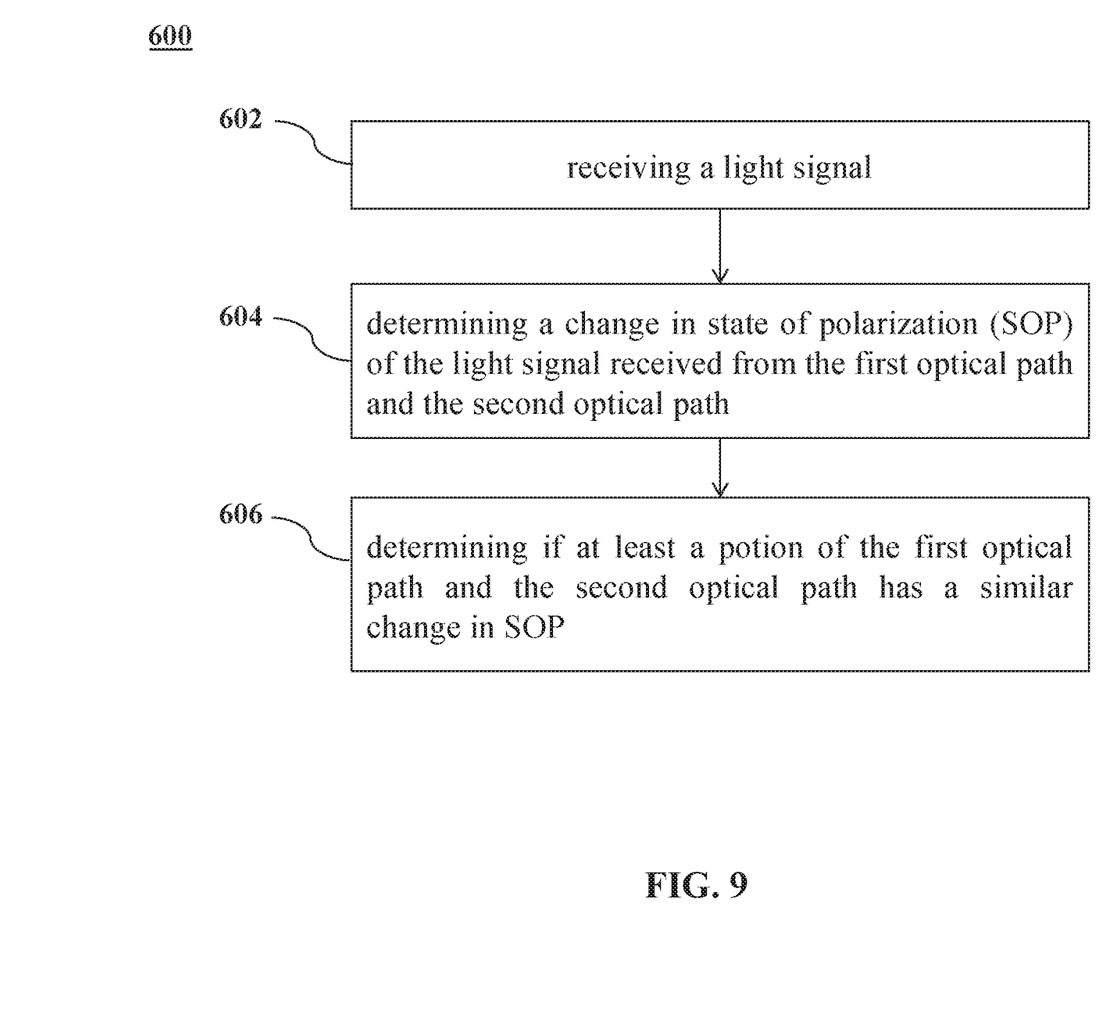
FIG. 9 depict flowcharts representing processes directed to a method implemented on a system to determine non-disjoint links in the optical network, in accordance with various embodiments of present disclosure.

FIG. 9 depict flowcharts representing processes 600 directed to a method implemented on a system to determine the non-disjoint links in optical network 200, in accordance with various embodiments of present disclosure.

As shown, process 600 begins at step 602, where an optical node receives a light signal. As previously discussed, end node 202-4 receives a light signal transmitted by start node 202-1. End node 202-4 receives the light signal from working path 208-1 and protection path 208-2.

Process 600 advances to step 604, where the optical node determines a change in state of polarization (SOP) of the light signal received from the first optical path and the second optical path. As noted above, end node 202-4 determines the change in SOP of the light signal received from working path 208-1 and protection path 208-2. In certain non-limiting steps the change in SOP is determined by the SOP change detector 300 while in other non-limiting steps, the change in SOP may be determined by a polarimeter or a coherent receiver.

Finally at step 606, a processing unit determines if at least a portion of the first optical path and the second optical path has a similar change of SOP. As discussed above, processing unit 406 may be configured to determine if a portion of working path 208-1 and protection path 208-2 has a similar change in SOP in light signal. In some steps, processing unit 406 may compare the extracted frequency components associated with a low frequency acoustic wave signal by the end node such as end node 202-4 with the respective frequency information associated with plurality of acoustic wave generators 206-1, 206-2 . . . 206-6. In other steps, processing unit 406 may compare the timing information with low frequency acoustic wave signal determined by the end node such as end node 202-4 with the respective timing information associated with plurality of acoustic wave generators 206-1, 206-2 . . . 206-6.

In some steps, processing unit 406 may be configured to change at least a portion of working path 208-1 and/or a portion of protection path 208-2 to make the two paths disjoint.

Thus by virtue of system 400 and process 600, disjointness between working node 208-1 and protection path 208-2 is determined in a cost effective and an efficient manner without adding much hardware complexity.

It is to be understood that the operations and functionality of system 400, constituent components, and associated processes may be achieved by any one or more of hardware-based, software-based, and firmware-based elements. Such operational alternatives do not, in any way, limit the scope of the present disclosure.

It will also be understood that, although the embodiments presented herein have been described with reference to specific features and structures, it is clear that various modifications and combinations may be made without departing from such disclosures. The specification and drawings are, accordingly, to be regarded simply as an illustration of the discussed implementations or embodiments and their principles as defined by the appended claims, and are contemplated to cover any and all modifications, variations, combinations or equivalents that fall within the scope of the present disclosure.

What is claimed is:

1. An optical communication system comprising:
   a start optical node comprising a first data transmitter and a second data transmitter;
   an end optical node comprising a first coherent receiver and a second coherent receiver;
      the first data transmitter configured to transmit a first data-bearing light signal on a first optical path and the first coherent receiver configured to receive the first data-bearing light signal;
      the second data transmitter configured to transmit a second data-bearing light signal on a second optical path and the second coherent receiver configured to receive the second data-bearing light signal;
      the first and second coherent receivers configured to detect a change in state of polarization (SOP) in the first and second data-bearing light signal; and
   a processing unit configured to determine if at least a portion of the first optical path and the second optical path exhibit a similar change in the SOP.

2. The optical communication system of claim 1, further comprising at least one acoustic wave generator configured to generate at least one low frequency acoustic wave signal, wherein the at least one low frequency acoustic wave signal is transmitted along the first optical path and the second optical path.

3. The optical communication system of claim 2, wherein the at least one low frequency acoustic wave signal changes the SOP of the light signal in the first optical path and the second optical path.

4. The optical communication system of claim 2, wherein the at least one acoustic wave generator comprises a plurality of acoustic wave generators configured to generate a plurality of low frequency acoustic wave signals, in which the plurality of low frequency acoustic wave signals are transmitted along the first optical path and the second optical path.

5. The optical communication system of claim 4, wherein the plurality of low frequency acoustic wave signals have different frequency components or a combination of frequency components resulting in a different frequency spectrum.

6. The optical communication system of claim 4, wherein the plurality of low frequency acoustic wave signals have a same frequency spectrum and are transmitted at different time instants along the first optical path and the second optical path.

7. The optical communication system of claim 4, wherein the plurality of acoustic wave generators provides frequency and timing information associated with the plurality of low frequency acoustic wave signals to the processing unit.

8. The optical communication system of claim 7, wherein the end optical node is further configured to perform one or more of:
   extracting low frequency components associated with the at least one low frequency acoustic wave signal in the light signal; wherein the processing unit compares the extracted low frequency components with the frequency components associated with the at least one low frequency acoustic signal;
   determining the timing information associated with the at least one low frequency acoustic wave signal in the light signal wherein the processing unit compares the determined timing information with the timing information at which the at least one low frequency acoustic signal was generated.

9. An optical communication method comprising:
   generating, by at least one acoustic wave generator, at least one low frequency acoustic wave signal, that is transmitted along a first optical path and a second optical path, such that the at least one low frequency acoustic wave signal changes a state of polarization (SOP) of a light signal in the first optical path and the second optical path;
   receiving, by an optical node, the light signal, in which the light signal is received from the first optical path and the second optical path;
   determining, by the optical node, the change in the SOP of the light signal received from the first optical path and the second optical path; and
   determining, by a processing unit, if at least a portion of the first optical path and the second optical path exhibit a similar change in the SOP.

10. The method of claim 9, wherein the at least one acoustic wave generator comprises a plurality of acoustic wave generators configured to generate a plurality of low frequency acoustic wave signals, in which the plurality of low frequency acoustic wave signals are transmitted along the first optical path and the second optical path.

11. The method of claim 10, wherein the plurality of low frequency acoustic wave signals have different frequency components or a combination of frequency components resulting in a different frequency spectrum.

12. The method of claim 10, wherein the plurality of low frequency acoustic wave signals have a same frequency spectrum and are transmitted at different time instants along the first optical path and the second optical path.

13. The method of claim 10, wherein the plurality of acoustic wave generators provides frequency and timing information associated with the plurality of low frequency acoustic wave signals to the processing unit.

14. The method of claim 13, wherein the method performs one or more of:
   extracting low frequency components associated with the at least one low frequency acoustic wave signal in the light signal wherein the processing unit compares the extracted low frequency components with the frequency components associated with the at least one low frequency acoustic signal;
   determining the timing information associated with the at least one low frequency acoustic wave signal in the light signal wherein the processing unit compares the determined timing information with the timing information at which the at least one low frequency acoustic signal was generated.

15. An optical communication system comprising:
an optical node configured to receive a light signal, in which the light signal is received from a first optical path and a second optical path, and the optical node is further configured to determine a change in state of polarization (SOP) of the light signal received from the first optical path and the second optical path;
wherein, the optical node comprises:
  a polarizer configured to filter a determined change in SOP in the light signal;
  a photodetector configured to convert the light signal provided by the polarizer to electrical signal;
  a polarization controller configured to orient the change in SOP in the light signal such that the change in SOP is substantially linear and perpendicular when the light signal is forwarded to the polarizer; and
  a signal processor configured to extract frequency components from the electrical signal; and
a processing unit configured to determine if at least a portion of the first optical path and the second optical path exhibit a similar change in the SOP.

16. The optical communication system of claim 15, further comprising at least one acoustic wave generator configured to generate at least one low frequency acoustic wave signal, wherein the at least one low frequency acoustic wave signal is transmitted along the first optical path and the second optical path.

17. The optical communication system of claim 15, wherein the at least one low frequency acoustic wave signal changes the SOP of the light signal in the first optical path and the second optical path.

18. The optical communication system of claim 15, wherein the optical node comprises a polarimeter configured to detect the change in SOP in the light signal.

19. The optical communication system of claim 15, wherein if the change in SOP is induced by natural vibrations, the processing unit is further configured to:
  perform a correlation operation on the determined change in SOP of the light signal received from the first optical path and the second optical path and determine a similarity parameter; and
  if the similarity parameter is above a certain threshold, determine that at least a portion of the first optical path and the second optical path share a common path.

20. The optical communication system of claim 15, wherein the optical node is an end optical node and the light signal is transmitted by a start optical node.

21. An optical communication method comprising:
receiving, by an optical node, a light signal, in which the light signal is received from a first optical path and a second optical path;
determining, by the optical node, a change in state of polarization (SOP) of the light signal received from the first optical path and the second optical path; and
determining, by a processing unit, if at least a portion of the first optical path and the second optical path exhibit a similar change in SOP;
wherein, if the change in SOP is induced by natural vibrations,
  the processing unit performs a correlation operation on the determined change in SOP of the light signal received from the first optical path and the second optical path and determine a similarity parameter; and
  if the similarity parameter is above a certain threshold, the processing unit determines that at least a portion of the first optical path and the second optical path share a common path.

22. An optical communication method comprising:
receiving, by an optical node, a light signal, in which the light signal is received from a first optical path and a second optical path;
determining, by the optical node, a change in state of polarization (SOP) of the light signal received from the first optical path and the second optical path; and
determining, by a processing unit, if at least a portion of the first optical path and the second optical path exhibit a similar change in the SOP;
  wherein if the at least portion of the first optical path and the second optical path is determined to have the similar change in SOP, the processing unit changes at least a portion of the first optical path or a portion of the second optical path with a different sub-path.

23. The method of claim 22, wherein the optical node is an end optical node and the light signal is transmitted by a start optical node.

* * * * *